US012739496B2

(12) United States Patent
Yamasaki et al.

(10) Patent No.: US 12,739,496 B2
(45) Date of Patent: Sep. 15, 2026

(54) IMAGING APPARATUS CONFIGURED TO APPLY FIRST AND SECOND COLOR CONVERSION DATA TO IMAGE DATA

(71) Applicant: Panasonic Intellectual Property Management Co., Ltd., Osaka (JP)

(72) Inventors: Takaaki Yamasaki, Osaka (JP); Motonori Ogura, Kyoto (JP); Shinichi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 45 days.

(21) Appl. No.: 18/961,592

(22) Filed: Nov. 27, 2024

(65) Prior Publication Data

US 2025/0193512 A1 Jun. 12, 2025

(30) Foreign Application Priority Data

Dec. 8, 2023 (JP) ................................ 2023-207663

(51) Int. Cl.
*H04N 23/63* (2023.01)
*H04N 23/667* (2023.01)
*H04N 23/84* (2023.01)

(52) U.S. Cl.
CPC ........... *H04N 23/632* (2023.01); *H04N 23/84* (2023.01); *H04N 23/667* (2023.01)

(58) Field of Classification Search
CPC ..... H04N 23/632; H04N 23/84; H04N 23/667
See application file for complete search history.

(56) References Cited

U.S. PATENT DOCUMENTS 8,854,256 B2 * 10/2014 Aokage .................. H04N 23/88 348/241
2023/0156168 A1 * 5/2023 Cho ....................... H04N 23/88 348/222.1
2023/0209176 A1 * 6/2023 Yamasaki ............ H04N 23/631 348/333.02
2023/0217098 A1 * 7/2023 Wang .................. H04N 23/632 348/333.02
2023/0269495 A1 8/2023 Matsuno et al.

FOREIGN PATENT DOCUMENTS

JP 2007-221606 A 8/2007
JP 7129678 B1 9/2022
JP 2023-121532 A 8/2023
JP 2023-121533 A 8/2023

* cited by examiner

*Primary Examiner* — Gevell V Selby
(74) *Attorney, Agent, or Firm* — Renner, Otto, Boisselle & Sklar, LLP

(57) ABSTRACT

An imaging device includes: an imaging sensor configured to capture a subject image to generate image data; a storage configured to store a plurality of color conversion data each defining a corresponding relationship between color information of an image before and after color conversion; an output unit configured to output a live view screen based on the image data; an operation unit configured to receive a user operation; and a controller configured to designate first color conversion data and second color conversion data from the plurality of color conversion data, in accordance with the user operation. The live view screen presents a live view image resultant of image processing of applying the first color conversion data and the second color conversion data to the image data.

7 Claims, 15 Drawing Sheets

100
110
115
IMAGE SENSOR
120
IMAGE PROCESSOR
125
BUFFER MEMORY
130
DISPLAY
135
CONTROLLER
155
VIDEO OUTPUT TERMINAL
160
MONITOR
141
CARD SLOT
142
MEMORY CARD
143
COMMUNICATION MODULE
145
FLASH MEMORY
150
OPERATION MEMBER

PHOTO STYLE
LUT
PHOTO STYLE
・STANDARD
・VIVID
・NATURAL
・FLAT
・MONOCHROME
・LOG
LUT
・VINTAGE
・ROSE
・FASHION

145
FLASH MEMORY
10
PHOTO STYLE SETTING INFORMATION
PHOTO STYLE 1
PHOTO STYLE 2
...
PHOTO STYLE n
11
LUT SETTING INFORMATION
LUT1
LUT2
...
LUTm
12
IMAGE PROCESSING SETTING INFORMATION
13
PHOTO STYLE SELECTION INFORMATION
14
LUT SELECTION INFORMATION
1ST LUT
DENSITY OF 1ST LUT
2ND LUT
DENSITY OF 2ND LUT
...

130
41
43
LUT
1
2
3
4
42
1
2
3
4
40%
40%
50%
40%
60%
40%
40%
50%
50%
50%
60%
50%
40%
60%
50%
60%
60%
60%
Set
44

130
LUT
1
2
3
4
1
2
3
4
50%
30%
60%
30%
70%
30%
50%
40%
60%
40%
70%
40%
50%
50%
60%
50%
70%
50%
Set

START
S11
CONTROL IMAGING OPERATION OF IMAGE SENSOR
S12
PERFORM IMAGE PROCESSING OF APPLYING PHOTO STYLE TO IMAGED DATA
S13
PERFORM IMAGE PROCESSING OF APPLYING LUTS TO PROCESSED IMAGE DATA, WITH DENSITY OF EACH OF LUTS REFLECTED
S14
DISPLAY LIVE VIEW IMAGE SHOWN BY IMAGE DATA, WHICH IS RESULT OF APPLICATION OF LUTS
END

IMAGING APPARATUS CONFIGURED TO APPLY FIRST AND SECOND COLOR CONVERSION DATA TO IMAGE DATA

CROSS REFERENCE TO RELATED APPLICATION

This application claims priority to Japanese Patent Application 2023-207663 filed on Dec. 8, 2023, the contents of which are incorporated herein by reference.

BACKGROUND

Technical Field

The present disclosure relates to an imaging device.

Background Art

The imaging device disclosed in JP 2023-121532 A includes an acquisition unit that acquires a first lookup table (LUT) for converting image data, a setting unit that sets a degree by which the first LUT is applied, and a generation unit that generates a second LUT from the first LUT on the basis of the set degree by which the first LUT is applied. The imaging device disclosed in JP 2023-121532 A converts image data acquired by an imaging unit using the second LUT generated by the generation unit.

SUMMARY

The present disclosure provides an imaging device capable of making it easier to apply color conversion data to an image in a manner suitable for a preference of a user.

An imaging device according to one aspect of the present disclosure includes:

- an imaging sensor configured to capture a subject image to generate image data;
- a storage configured to store a plurality of color conversion data each defining a corresponding relationship between color information of an image before and after color conversion;
- an output unit that configured to output a live view screen based on image data;
- an operation unit configured to receive a user operation; and
- a controller that designates first color conversion data and second color conversion data from the plurality of color conversion data, in accordance with a user operation, in which
- the live view screen presents a live view image resultant of image processing of applying the first color conversion data and the second color conversion data to the image data.

According to the imaging device according to the present disclosure, color conversion data can be more easily applied to an image in a manner suitable for a preference of a user.

DETAILED DESCRIPTION

Embodiments will now be explained with reference to drawings as appropriate. However, descriptions more in detail than necessary may be omitted. Note that the accompanying drawings and the following description are provided to facilitate those skilled in the art to fully understand the present disclosure, and the accompanying drawings and the following description are not intended to limit the subject matter defined in the claims in any way.

First Embodiment

1. Configuration 1-1. Hardware Configuration

Figure 1:
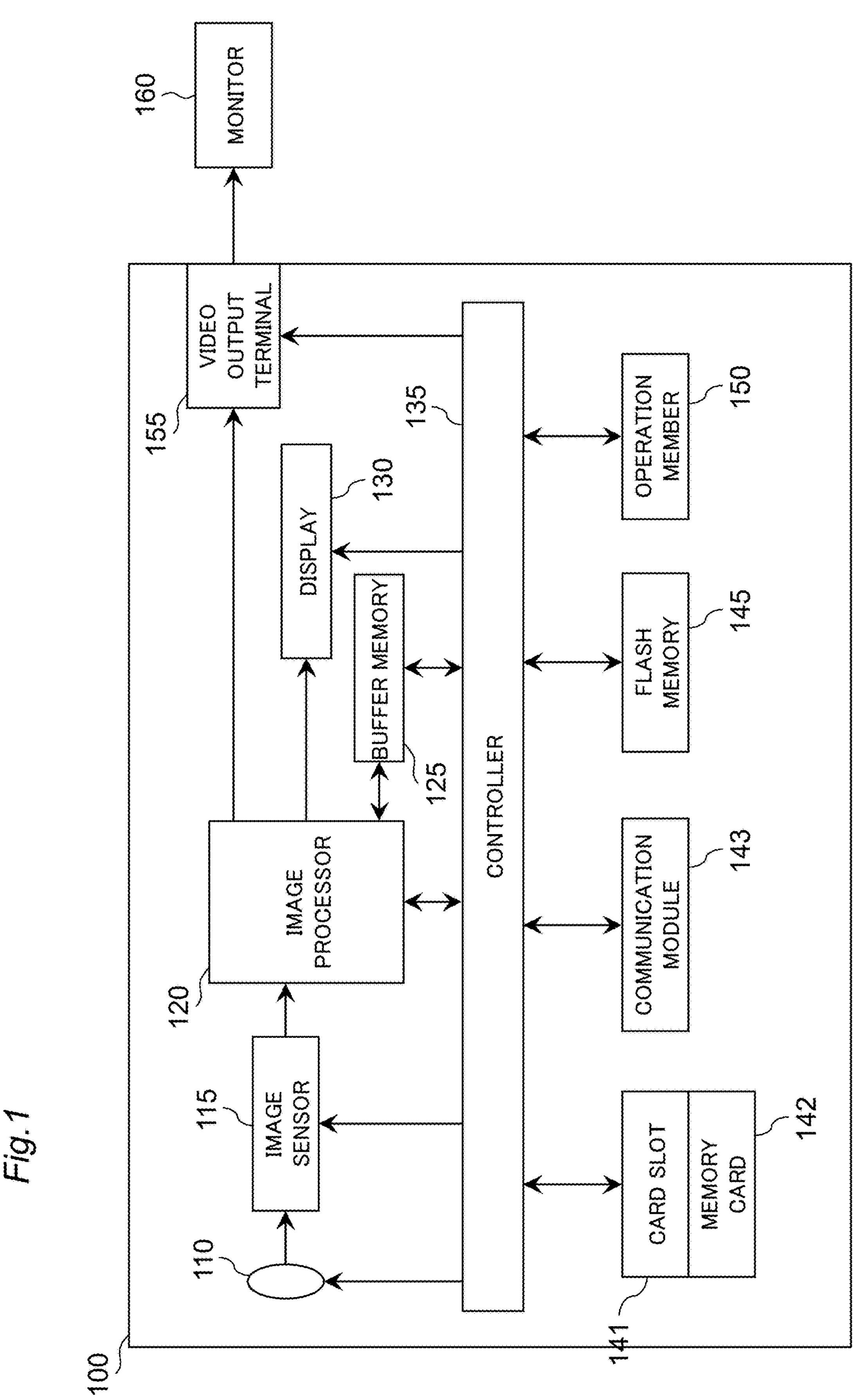
FIG. 1 is a block diagram illustrating a configuration example of a digital camera according to a first embodiment.

FIG. 1 is a block diagram illustrating a configuration example of a digital camera 100 according to a first embodiment of the present disclosure. The digital camera 100 generates image data by capturing a subject image. The image data generated by the digital camera 100 includes moving image data and still image data.

The digital camera 100 forms a subject image on an image sensor 115 through an optical system 110, and generates original image data (RAW data) by capturing the subject image. The image processor 120 generates image data by performing various types of processing on the RAW data generated by the image sensor 115. The controller 135 records the image data generated by the image processor 120 in a flash memory 145 or a memory card 142 inserted into a card slot 141. In addition, the controller 135 can display (reproduce) the image data recorded in the flash memory 145 or the memory card 142 on a display 130, in accordance with a user operation on the operation unit 150.

The optical system 110 includes a focus lens, a zoom lens, an optical image stabilization (OIS) lens, an aperture, and a shutter, for example. Various lenses included in the optical system 110 may include any number of lenses or any number of lens groups.

The image sensor 115 generates RAW data by capturing the subject image formed through the optical system 110. The image sensor 115 generates image data of a new frame at a predetermined frame rate (e.g., 30 frames/sec.). The timing of RAW data generation and the operations of the electronic shutter in the image sensor 115 are controlled by the controller 135. Note that, as the image sensor 115, various types of image sensor such as a CMOS image sensor, a CCD image sensor, or an NMOS image sensor may be used. The image sensor 115 is an example of an imaging unit according to the embodiment.

The image processor 120 generates image data by performing various types of processing on the RAW data output from the image sensor 115. The image processor 120 also generates an image to be displayed on the display 130, by performing various types of processing on the image data read from the memory card 142. Such an image may be output to an external monitor 160 via a video output terminal 155. Examples of the various types of processing include, but are not limited to, white balance correction, gamma correction, YC conversion processing, electronic zoom processing, compression processing, decompression processing, and image processing that uses a lookup table (LUT). The image processor 120 may be configured as a hard-wired electronic circuit or a microcomputer using a program.

The display 130 is a display device such as a liquid crystal display or an organic EL display capable of displaying information. The display 130 displays, for example, an image that is based on the image data processed by the image processor 120. The display 130 also displays a menu screen for allowing a user to check settings of the digital camera 100.

The external monitor 160 is also a display device such as a liquid crystal display or an organic EL display, and is capable of displaying an image that is based on the image data processed by the image processor 120. The video output terminal 155 includes an interface circuit via which the digital camera 100 and an external device such as monitor 160 can be connected. The video output terminal 155 performs communication in accordance with a protocol such as universal serial bus (USB), HDMI (registered trademark), or Bluetooth (registered trademark).

The controller 135 integrally controls the entire operations of the digital camera 100. The controller 135 may include a processor configured to implement a predetermined function by executing a program. The controller 135 may be implemented by various types of processor such as a CPU, an MPU, a GPU, a DSU, an FPGA, or an ASIC, for example. The controller 135 may include one or more processors. The controller 135 may be configured as one semiconductor chip, together with elements such as the image processor 120. The controller 135 has an internal ROM, although not illustrated. The ROM stores therein various programs, such as autofocus (AF) control program, executed by the controller 135. The controller 135 also has an internal RAM (not illustrated) that functions as a working area of the CPU.

A buffer memory 125 is a recording medium that functions as a working memory of the image processor 120 and the controller 135. The buffer memory 125 is implemented as a dynamic random access memory (DRAM), for example.

The memory card 142 is inserted removably into the card slot 141. The card slot 141 can connect to the memory card 142 electrically and mechanically. The memory card 142 is an external memory including an internalized recording element such as a flash memory. The memory card 142 can store therein data such as an LUT and image data generated by the image processor 120.

A communication module 143 performs data communication in accordance with an existing wired communication protocol or wireless communication protocol. For example, the digital camera 100 can communicate with a communication network, such as the Internet and/or another device equipped with a Wi-Fi module via the communication module 143. The digital camera 100 may communicate directly with another device via the communication module 143, or may communicate via an access point. The card slot 141 and the communication module 143 are examples of an output interface that outputs data, according to the present disclosure.

The flash memory 145 is a nonvolatile recording medium. The flash memory 145 can store therein various types of data such as an LUT, photo style setting information 10, LUT setting information 11, image processing setting information 12, and image data, which will be described later.

The operation unit 150 is a collective term for referring to user interfaces such as a hardware key and a software key of the digital camera 100, and receives an user operation. Examples of the operation unit 150 includes a button, a mode dial, a touch panel, and a switch. Upon receiving a user operation, the operation unit 150 transmits an operation signal corresponding to the user operation to the controller 135.

The operation unit 150 includes various buttons such as an information display switching (DISPLAY) button, a menu/setting (MENU/SET) button, a return button, an OK button, cursor buttons, and a Q button to be described later. The cursor buttons include pressing buttons corresponding to up, down, left, and right, respectively, and the user can press these buttons to move a selected area displayed on the display 130, a cursor, and the like. The operations using these various buttons may be executable not only by physical buttons but also via a touch panel.

1-2. Photo Styles and LUTs

The digital camera 100 has a plurality of shooting modes prepared in advance, so that an image can be easily shot using a color tone and an image quality that is based on user's preferences. Hereinafter, this shooting mode will be referred to as a "photo style". Furthermore, in the digital camera 100 according to this embodiment, an LUT for color grading, for example, imported from the external as the user prefers, can be applied to each photo style.

1-2-1. Photo Styles

When a photo style is selected on the digital camera 100, various parameters are set so as to generate an image having an effect specified in the photo style. Specifically, for each photo style, values of parameters such as contrast, highlight, shadow, saturation, color tone, hue, filter effect, granularity, sharpness, noise reduction, and density are set in such a manner that the effect specified in the photo style are achieved. In this manner, each of the photo styles serves as a set of image adjustment parameters for adjusting the image represented by the RAW data.

Figure 2:
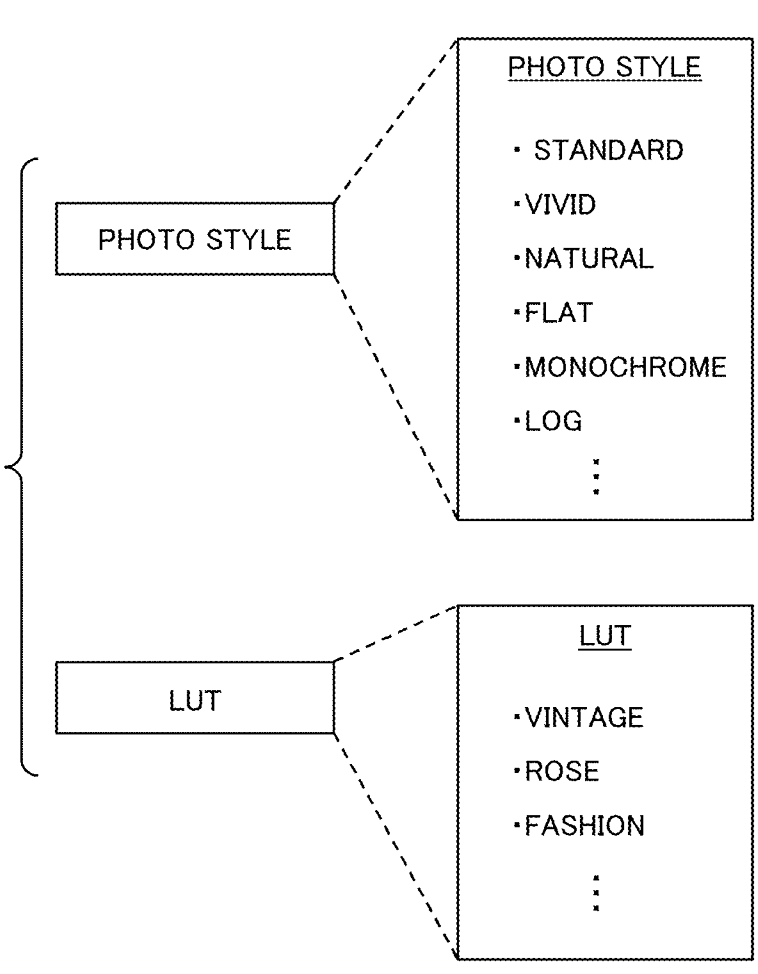
FIG. 2 is a diagram for explaining photo styles and LUTs.

As illustrated in FIG. 2, photo styles such as "standard", "vivid", "natural", "flat", "monochrome", and "log" are prepared in the digital camera 100. "Standard" is a standard setting, and "vivid" is a mode enabled to achieve a vivid effect with a high saturation and a high contrast. "Natural" is a mode enabled to achieve a soft effect with a low contrast. "Monochrome" is a mode for obtaining a monochromatic effect without hue.

"Log" is a mode for capturing an image using a logarithmic gamma curve (hereinafter, "log image") for making wide use of the dynamic range of the imaging element, and is also called log gamma. "Flat" is a mode using a flat gamma curve instead of log gamma, and for achieving an effect with exaggeration suppressed, compared with the other photo styles.

1-2-2. LUT

LUTs are stored in an external server in a downloadable manner, for example. An LUT is downloaded from the server by the information processing apparatus, and stored in the flash memory 145 of the digital camera 100 in advance.

An LUT is an array (parameter set) that defines a corresponding relationship between the color information of the input image before and after conversion in units of one pixel. An example of an LUT is a three-dimensional lookup table indicating a relationship between input and output color data including combinations of RGB three colors. By referring to the LUT, the image processor 120 performs image processing for converting the colors of input image data into the colors of output image data.

In the digital camera 100, for example, as illustrated in FIG. 2, names such as "vintage", "rose", and "fashion" may be set to the respective LUTs, in accordance with the coloring, the theme, the intention of the creator, and the like of the output image data.

When a user attempts to create a unique LUT, it is easier for the user to recognize the effect of color correction by attempting such color correction from the hue closer to the coloring of the subject perceived by naked eyes of humans, such as those in Standard, rather than by attempting the color correction from the hue of a log image, the saturation and contrast of which are low. Therefore, by making a unique LUT available on the digital camera 100, a user can easily create and use an LUT matching his/her preference.

1-2-3. Selection of Photo Style to which LUT is Applied

LUTs currently distributed are generally created on a basis of an assumption that LUTs are applied to log images. The user can acquire LUTs for log images on the Internet for free, or purchase LUTs from a seller, such as an expert of image processing, for example, and collect the LUT into the digital camera 100.

The digital camera 100 according to this embodiment provides a user an option to combine an LUT with their favorite photo style, as illustrated in FIG. 2, so as not to be bound by the fixed idea that LUTs applicable to the image data need to be LUTs for log images.

For example, users can create an LUT assuming use with their preferred photo styles, among "standard", "vivid", "natural", "flat", "monochrome", and the like, and store the LUT in the flash memory 145 via the memory card 142 or the like. As a result, for example, an image having the effect specified in the photo style "standard" can be applied with an LUT for standard images, instead of an LUT for log images.

1-2-4. Selection of Plurality of LUTs to be Applied to Image Data and Setting of Density to Each LUT The digital camera 100 according to this embodiment also provides users with an option to apply a plurality of LUTs (in an overlapping manner) to image data.

The capability for application of a plurality of LUTs in an overlapping manner has advantages such as those described below. That is, LUTs currently distributed are generally created on the assumption that LUTs are applied to log images. However, because log images are low in saturation and contrast, it may be difficult for a user to imagine the effect of color conversion to be achieved by applying an LUT to a log image. Therefore, the user may be able to perform color conversion as intended by applying a first LUT to a log image to generate an intermediate image with coloring closer to the colors of the subject perceived by the naked eyes of humans, and then applying a second LUT to the intermediate image thus generated.

Alternatively, or in addition thereto, by using combinations of a plurality of LUTs, the user can enjoy how the appearance of the image changes. For example, by combining multiple LUTs, a user may be able to generate an image with an unintended positive effect.

Alternatively, or in addition thereto, by allowing an LUT designed to enhance saturation to be applied in a manner layered over an LUT capable of emphasizing a specific color, e.g., red, users are better aided to perform color conversion suitable for users' preference.

Furthermore, in the digital camera 100 according to this embodiment, when a plurality of LUTs are applied to image data in a manner layered on top of each other, a user is enabled to set density of each of such LUTs. The digital camera 100 can display a setting screen related to a density setting on the display 130 so as to aid the user in setting the density of each of the plurality of LUTs.

In this embodiment, the density of an LUT is an index indicating the degree by which the LUT is applied to image data, and is specified as a value between 0 and 1 (0% and 100%), for example. Applying an LUT with a zero % density set thereto to input image data is substantially the same as not applying the LUT to the input image data.

1-2-5. Data Structure

Figure 3:
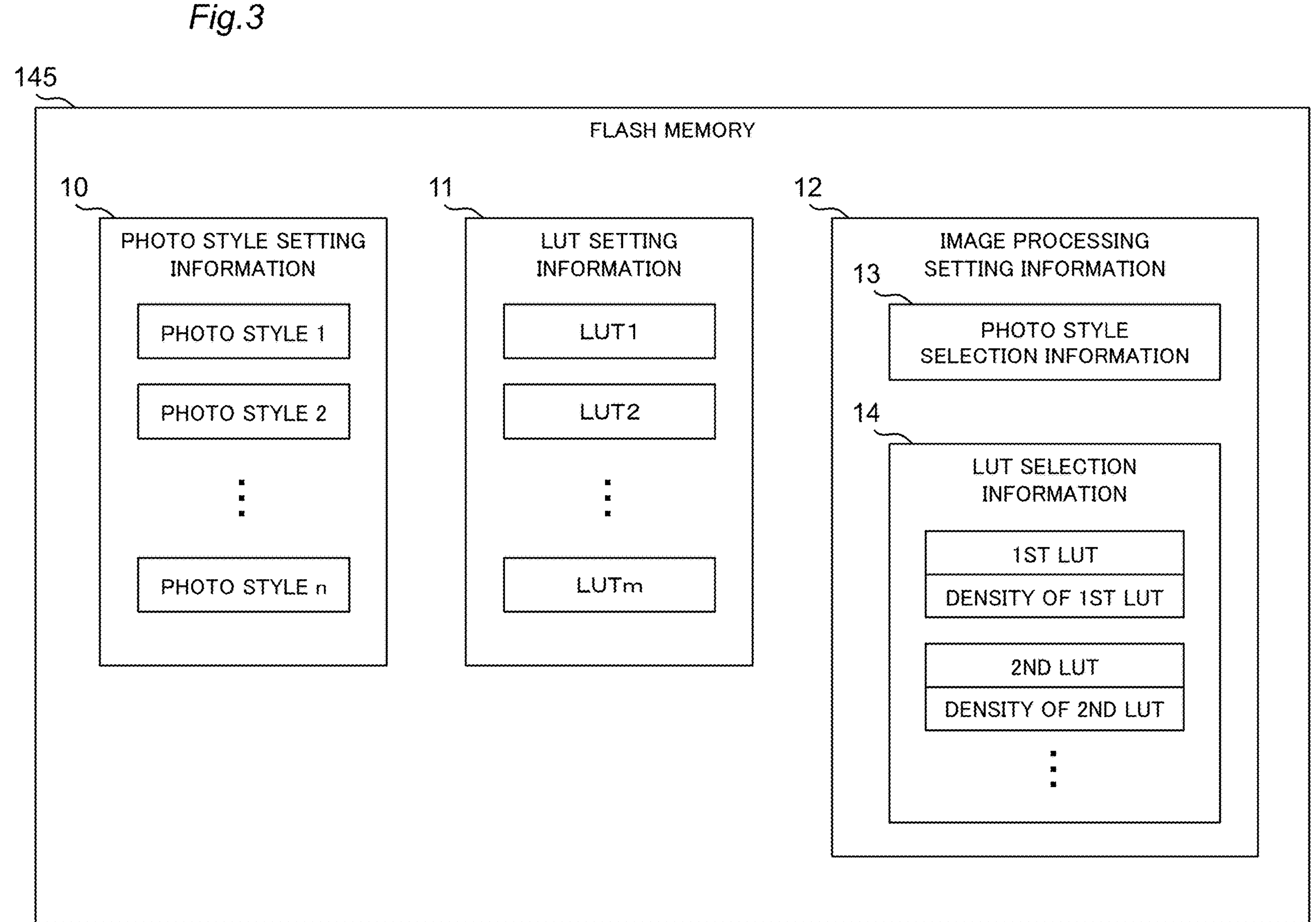
FIG. 3 is a diagram illustrating an example of a data structure stored in a flash memory of the digital camera.

FIG. 3 is a diagram illustrating an example of a data structure stored in the flash memory 145 of the digital camera 100 according to the embodiment. Setting information related to the photo styles and the LUTs is managed in the flash memory 145, as the photo style setting information 10 and the LUT setting information 11, respectively.

In FIG. 3, the photo style setting information 10 includes setting information related to one or more (n) photo styles. The LUT setting information 11 includes setting information related to two or more (m) LUTs.

As illustrated in FIG. 3, the flash memory 145 also stores therein the image processing setting information 12. The image processing setting information 12 includes photo style selection information 13 specifying the photo style selected by the user, and LUT selection information 14 specifying the plurality of LUTs and the density of each of the LUTs selected by the user. The photo style specified in the photo style selection information 13 and the plurality of LUTs specified in the LUT selection information 14 are sequentially applied to the RAW data output from the image sensor 115, and image data resultant of applying the photo styles and the LUTs is displayed on the display 130.

2. Operations 2-1. Operation for Setting Photo Style and LUTs 2-1-1. Sequence of Operations The digital camera 100 is configured to enable users to make settings and selections of a photo style and an LUT, such as those described above, that is, settings of the image processing setting information 12, easily, using the display 130 and the operation unit 150. An example of a method by which the image processing setting information 12 is set on the digital camera 100 will now be explained with reference to FIGS. 4 to 7.

Figure 4:
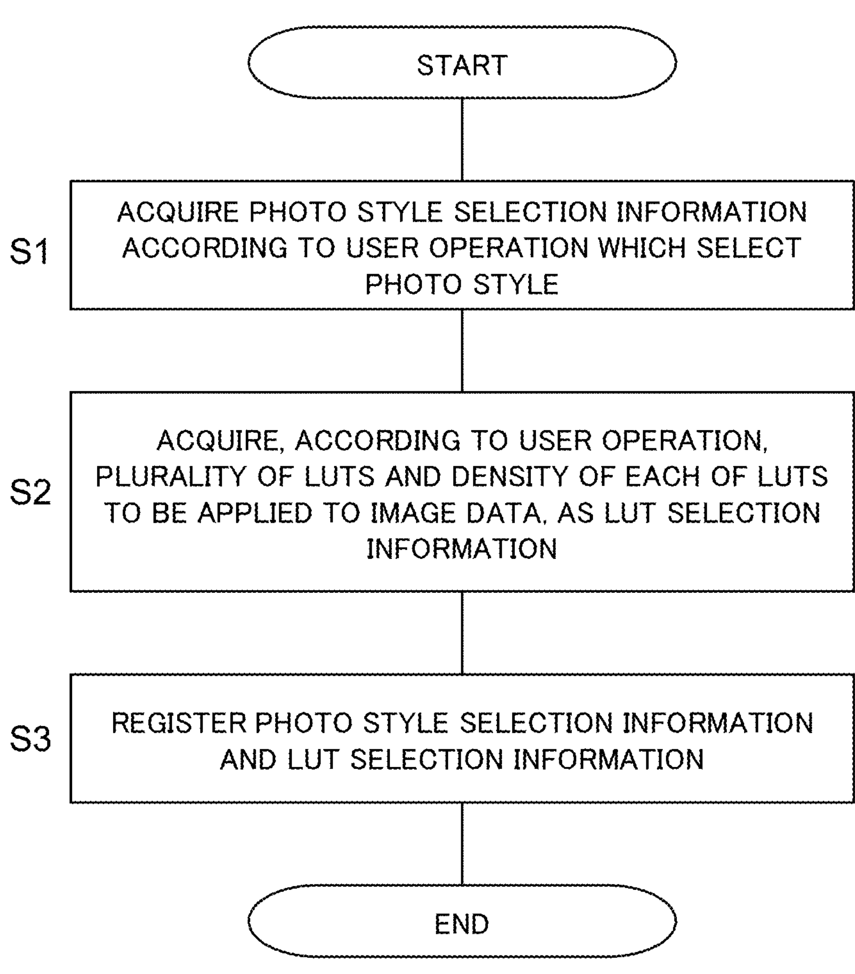
FIG. 4 is a flowchart for explaining an example of a method of setting image processing setting information in the digital camera.

FIG. 4 is a flowchart for explaining an example of a method of setting the image processing setting information 12 on the digital camera 100 according to this embodiment.

Each of the steps illustrated in the flowchart of FIG. 4 is executed by the controller 135.

The user can set the photo style selection information 13 by selecting a photo style using the operation unit 150. The controller 135 acquires the photo style selection information 13 set by the user operation (S1).

The user can set the LUT selection information 14 by selecting a plurality of LUTs and adjusting the density of each of the LUTs, using the operation unit 150. The controller 135 then acquires the plurality of LUTs selected by the user operation and the density of each of the LUTs designated by the user operation, as the LUT selection information 14 (S2).

The controller 135 then registers the photo style selection information 13 and the LUT selection information 14 in a manner associated to each other, as the image processing setting information 12 in the flash memory 145 (S3). The image processing setting information 12 may also be stored in a storage device of an external information processing apparatus via the memory card 142 or via the communication module 143, together with image data such as RAW data not having been applied with any LUT yet.

Using the image processing setting information 12, the information processing apparatus performs post-processing, such as post-editing and post-production, for applying the LUT to image data not having been applied with any LUT. In general, to allow an information processing apparatus external of a digital camera to reproduce an image applied with an LUT, the image as being perceived by a photographer or videographer (hereinafter referred to as "photographer") when the photographer has shot the image by applying the LUT to the image data, the photographer needs to record the LUT applied at the time of shooting the image. When a digital camera capable of setting the density of an LUT, as in the digital camera 100 according to this embodiment, is used for shooting, in order to reproduce an image applied with the LUT on the information processing apparatus, the photographer needs to record the density of the LUT applied when the photographer has shot the image.

The digital camera 100 according to this embodiment stores the image processing setting information 12 in the flash memory 145 or the storage device of the external information processing apparatus, together with image data such as RAW data not having been applied with any LUT yet. Therefore, it is possible to reduce the cumbersomeness of the photographer in recording the LUT and/or the density of the LUT, as described above.

2-1-2. Menu Setting of Plurality of LUTs and Density of Each LUT

In this embodiment, the digital camera 100 can apply a plurality of LUTs to an image being captured and being displayed on the display 130, in real time. The menu settings of the plurality of LUTs and the density of each of the LUTs on the digital camera 100 will now be explained with reference to FIGS. 5 to 8. FIGS. 5 to 8 illustrate an example of a sequence of display screens displayed on the display 130 of the digital camera 100 in the process illustrated in FIG. 4.

Figure 5:
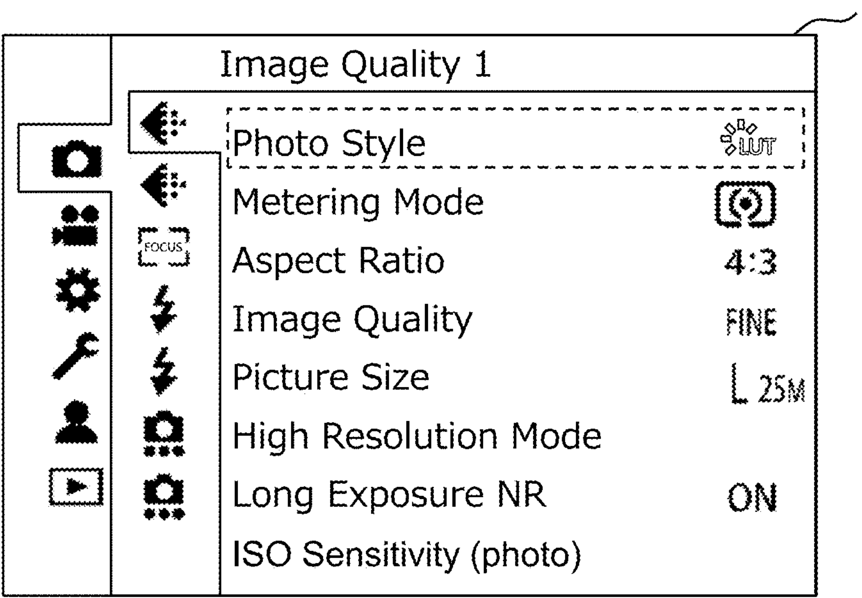
FIG. 5 is a diagram illustrating an example of a setting menu screen on the digital camera.

FIG. 5 illustrates an example of a setting menu screen on the digital camera 100. The digital camera 100 displays various setting items such as "photo style" on display 130, and receives a user operation for setting various setting items on the operation unit 150. Assuming that the user selects the setting item "photo style" on the setting menu screen in FIG. 5, for example, the controller 135 causes the display screen to transition to a photo style and LUT setting screen illustrated in FIG. 6 (hereinafter, sometimes simply referred to as an "LUT setting screen").

Figure 6:
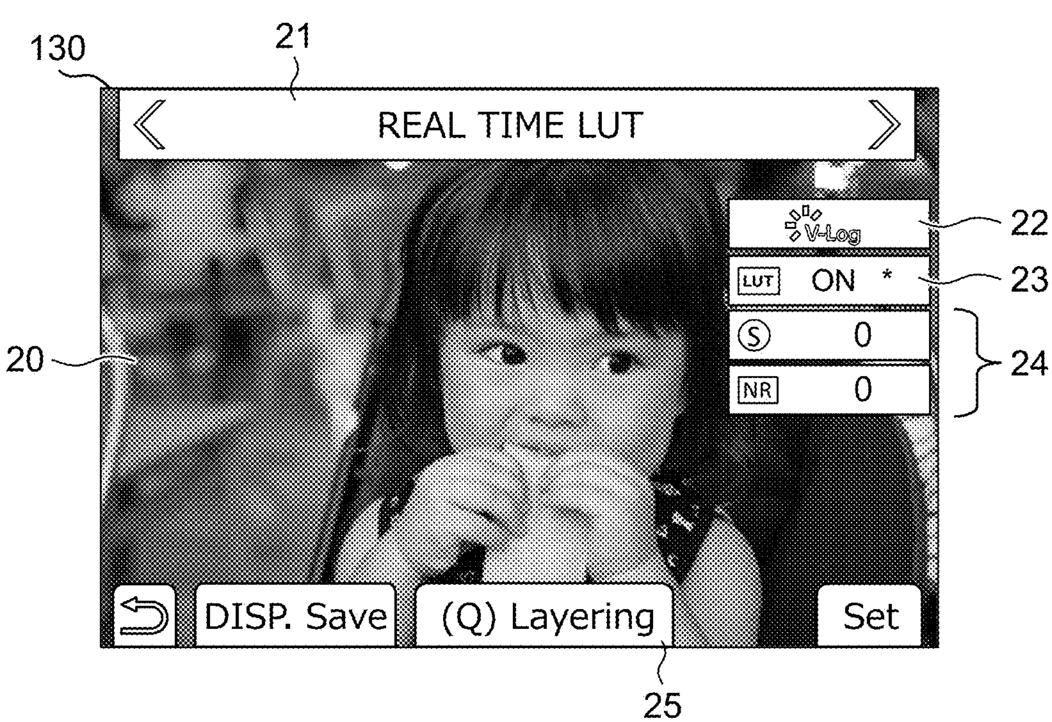
FIG. 6 is a diagram illustrating an example of an LUT setting screen on the digital camera.

The LUT setting screen illustrated in FIG. 6 includes a live view image 20 for live view. The live view is a function for displaying an image currently being captured by the digital camera 100, as a real-time moving image, for example. On the live view image 20, the user can visually check the effect of the LUT or the like.

The LUT setting screen illustrated in FIG. 6 also displays elements such as a menu indicator 21, a photo style indicator 22, an LUT mode indicator 23, parameter indicators 24, and a layering button 25. In the LUT setting screen according to this embodiment, an LUT, having an application mode, to be described later, set to ON is applied to the live view image 20.

The menu indicator 21 presents the user with a text or a diagram indicating that the screen currently being displayed is the photo style and LUT setting screen. In the example of FIG. 6, "real-time LUT" is displayed in the menu indicator 21. The "real-time LUT" is an image processing mode capable of providing a user with a mode for applying an LUT to an image data (LUT application mode).

The photo style indicator 22 presents a text, a diagram, a symbol, or the like indicating a photo style to be applied to the image being captured. In FIG. 6, the photo style indicator 22 displays an icon indicating the photo style "log". The user can select the photo style indicator 22 by pressing the cursor buttons, and then change the photo style to be applied in the "real-time LUT", by pressing left or the right cursor button, for example.

Alternatively, when the user presses the left or the right cursor button on the LUT setting screen illustrated in FIG. 6, the controller 135 may cause the display screen to transition from the LUT setting screen to a photo style selection screen. In the photo style selection screen, the menu indicator 21 resents a text or a diagram corresponding to a photo style which is a candidate to be selected. For example, in the photo style selection screen, the menu indicator 21 presents a text indicating a candidate photo style to be selected, such as "standard" or "vivid". The user can change the candidate photo style to be selected, by pressing the left or right cursor button, and confirms the photo style to be applied by pressing the OK button.

The LUT setting screen in FIG. 6 also has a comprehensive LUT mode indicator 23 indicating whether the LUT application mode is currently ON or OFF. When the mode for applying at least one LUT is set ON in layering setting screens illustrated in FIGS. 7A to 7F, to be described later, the controller 135 presents a text "ON" in the LUT mode indicator 23. When the mode for applying two or more LUTs is set ON in the layering setting screens to be described later, the controller 135 displays a symbol such as an asterisk "*" to the right side the text "ON" included in the LUT mode indicator 23.

The parameter indicators 24 include values of various parameters of the photo style described above, for example. For example, the user can make an operation for changing the value of a parameter such as contrast, highlight, shadow, saturation, granularity, sharpness, noise reduction, or density, by selecting a target adjustable parameter and pressing a left or right cursor button. The user is enabled to adjust the value of each parameter when the photo style is "standard", "vivid", "natural", "flat", or "monochrome", for example, as well as when the photo style is "log". Because a parameter having been changed is reflected to the image being displayed on the display screen in real time, the user can change the parameter while checking the effect. In response to such a user operation, the controller 135 acquires parameter change information indicating the parameter changed by the user operation.

Figure 7A:
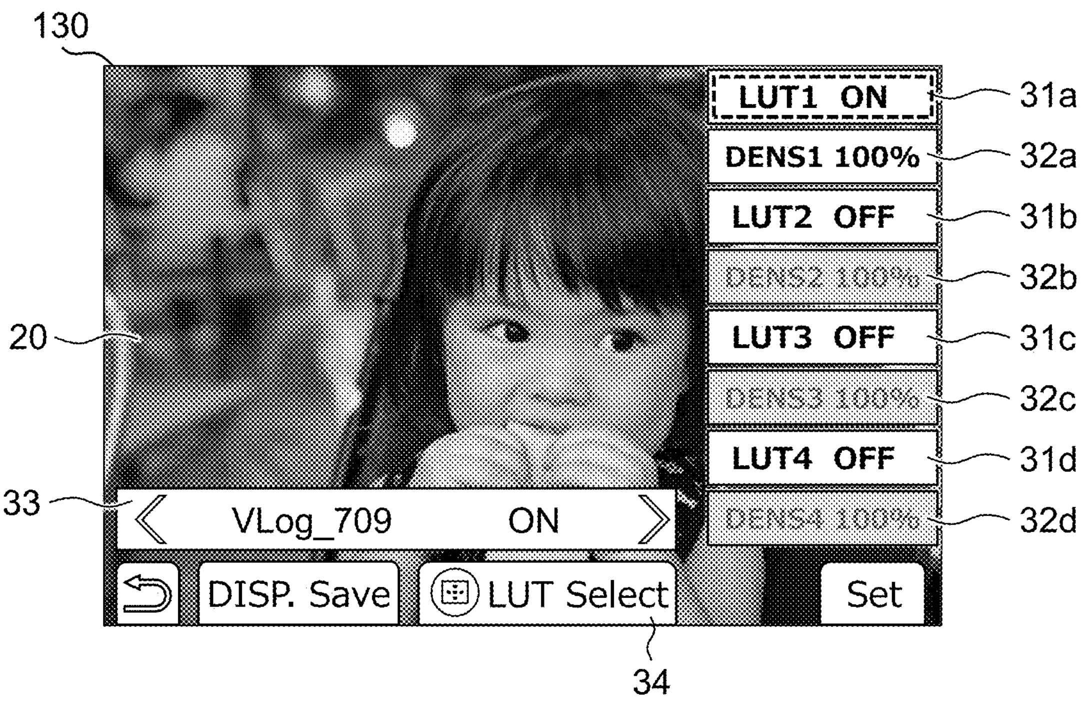
FIG. 7A is a diagram illustrating an example of a multi-LUT layering setting screen on the digital camera.

When the user presses the layering button 25 in the LUT setting screen illustrated in FIG. 6, the controller 135 causes the display screen to transition to the multi-LUT layering setting screen illustrated in FIG. 7A. The function of the layering button 25 is assigned to, for example, the Q button of the operation unit 150. In such a configuration, the user can cause the display screen to transition to the layering setting screen, also by pressing the Q button on the LUT setting screen.

The layering setting screen illustrated FIG. 7A includes individual LUT mode indicators each indicating whether the mode for applying each of a plurality of LUTs is ON or OFF. In the example illustrated in FIG. 7A, LUT mode indicators 31*a*, 31*b*, 31*c*, and 31*d* for four respective LUTs including an LUTs 1 to 4, are being displayed. In the initial state, for example, the LUT 1 is ON, and the other LUTs 2 to 4 are OFF, as illustrated in FIG. 7A.

The user can select an LUT mode indicator corresponding to a target LUT, by pressing a cursor button. In the example illustrated in FIG. 7A, the first LUT mode indicator 31*a* has been selected. The broken line illustrated in the first LUT mode indicator 31*a* in FIG. 7A indicates that the first LUT mode indicator 31*a* has been selected.

In response to the selection of the first LUT mode indicator 31*a*, as illustrated in FIG. 7A, an LUT switch menu 33 for switching ON and OFF of the mode for applying the LUT 1 corresponding to the selected first LUT mode indicator 31*a* appears. The LUT switch menu 33 includes the file name of the LUT identifying the LUT corresponding to the selected LUT mode indicator ("VLog_709" in FIG. 7A) and a state indicator indicating whether the LUT is currently ON or OFF. "VLog_709" is an example of an LUT for changing the coloring of log images having low saturation and low contrast, to a standard coloring closer to the colors of the subject perceived by the naked eyes of humans. In the initial state, for example, the LUT 1 is set to the LUT "VLog_709". In the example illustrated in FIG. 7A, the user can switch ON and OFF of the LUT "VLog_709" set in the LUT 1 by pressing a left or right cursor button, for example.

The layering setting screen illustrated in FIG. 7A also includes an LUT selection button 34. When the user presses the LUT selection button 34, the controller 135 causes the display screen to transition to the LUT selection screen illustrated in FIG. 7B. The LUT selection screen illustrated in FIG. 7B includes an LUT selection menu 35. In the example illustrated in FIG. 7B, the user can select the LUT corresponding to the first LUT mode indicator 31*a*, for example, by pressing the left or right cursor button. When the user presses the OK button or the return button in the LUT selection screen illustrated in FIG. 7B, the controller 135 causes the display screen to transition to the layering setting screen illustrated in FIG. 7A.

The layering setting screen illustrated in FIG. 7A also includes density indicators 32*a*, 32*b*, 32*c*, and 32*d* indicating the densities of the plurality of respective LUTs. The user can select the density indicator corresponding to a target LUT, by pressing a cursor button. For example, in the initial state, the density of the LUT 1 is set to 100%, as illustrated in the density indicator 32*a* in FIG. 7A. In the initial state illustrated in FIG. 7A, the density indicators 32*b*, 32*c*, and 32*d* corresponding to the respective LUTs 2 to 4 that are OFF all have "100%", are grayed out to indicate that these LUTs are OFF.

Figure 7B:
FIG. 7B is a diagram illustrating an example of an LUT selection screen on the digital camera.
Figure 7C:
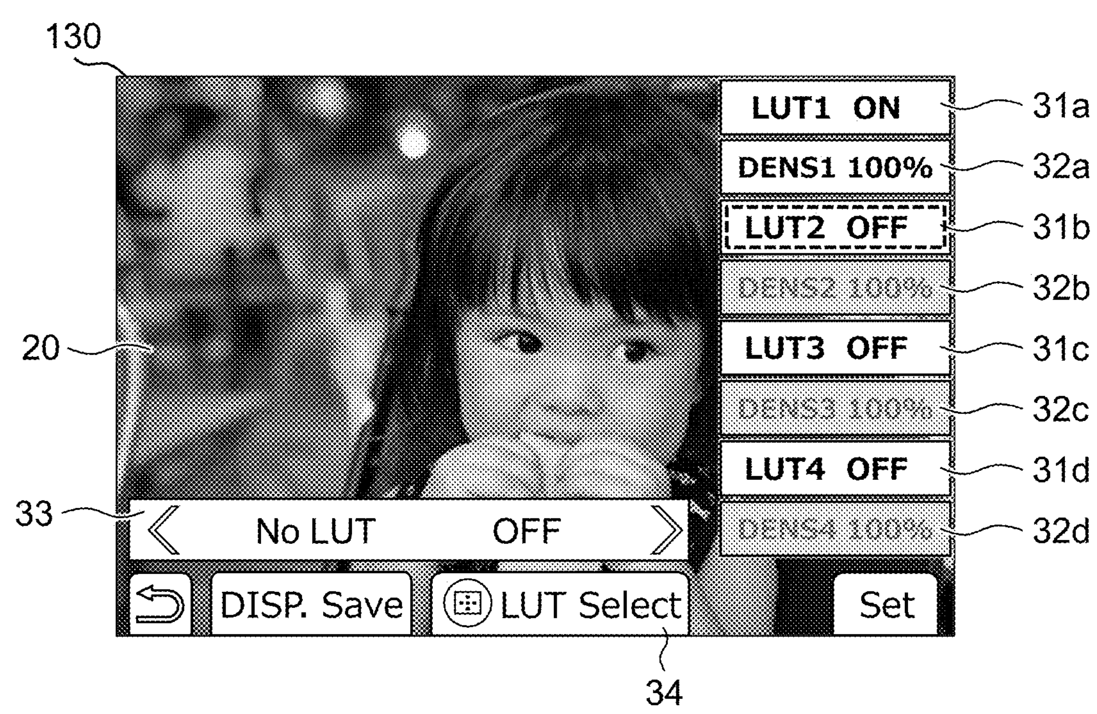
FIG. 7C is a diagram illustrating an example of the multi-LUT layering setting screen on the digital camera.

FIG. 7C illustrates an example in which the second LUT mode indicator 31*b* is selected in the layering setting screen. In the initial state, the LUTs 2 to 4 other than the LUT 1 is set to OFF, as mentioned above, and for example, no LUT file is allocated to the LUTs 2 to 4 that are OFF. The LUT switch menu 33 in FIG. 7C has "No LUT" to indicate that there is no LUT file allocated to the LUT 2.

Figure 7D:
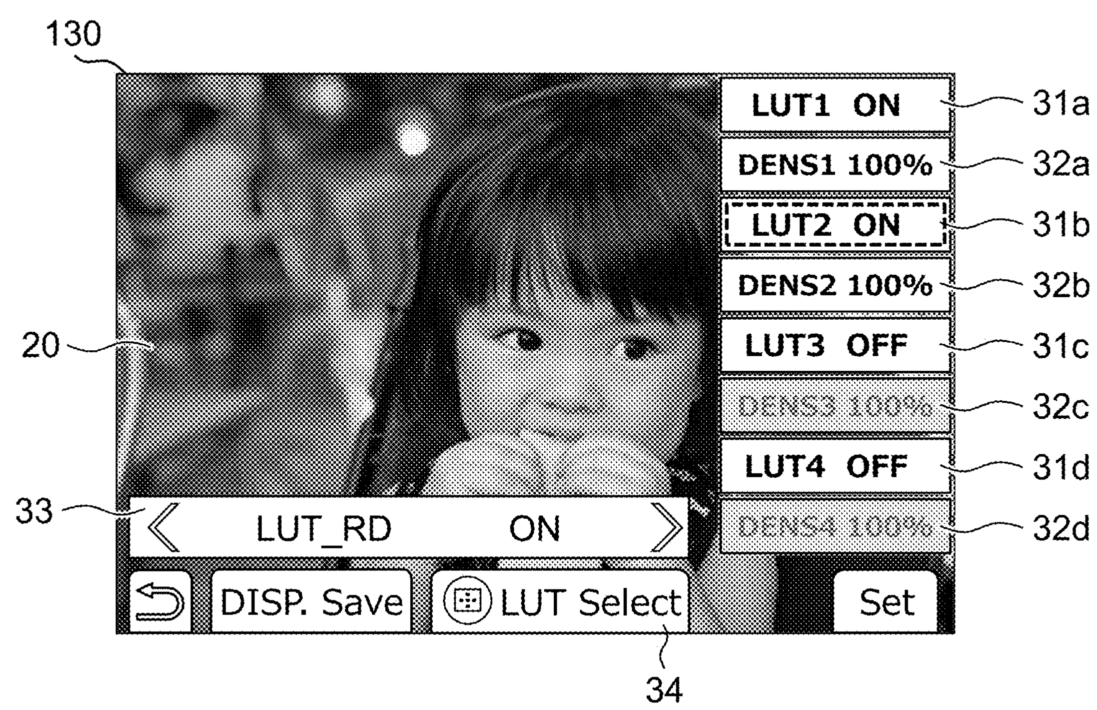
FIG. 7D is a diagram illustrating an example of the multi-LUT layering setting screen on the digital camera.

When the user presses the LUT selection button 34 on the layering setting screen in FIG. 7C, the controller 135 causes the display screen to transition to a LUT select screen that is similar to that in FIG. 7B. In the LUT selection screen, the user can select an LUT file to be allocated to the LUT 2. When the user selects the LUT file to be allocated to the LUT 2, and presses the OK button, the controller 135 causes the display screen to transition to the layering setting screen illustrated in FIG. 7D. When the LUT file to be allocated to the LUT 2 is selected, the second LUT mode indicator 31*b* and the LUT state indicator in the LUT switch menu 33 in FIG. 7D automatically change to "ON", and the gray-out of the density indicator 32*b* is removed. FIG. 7D illustrates an example in which "LUT_RD" is allocated to the LUT 2. "LUT_RD" is an example of an LUT for emphasizing red.

Figure 7E:
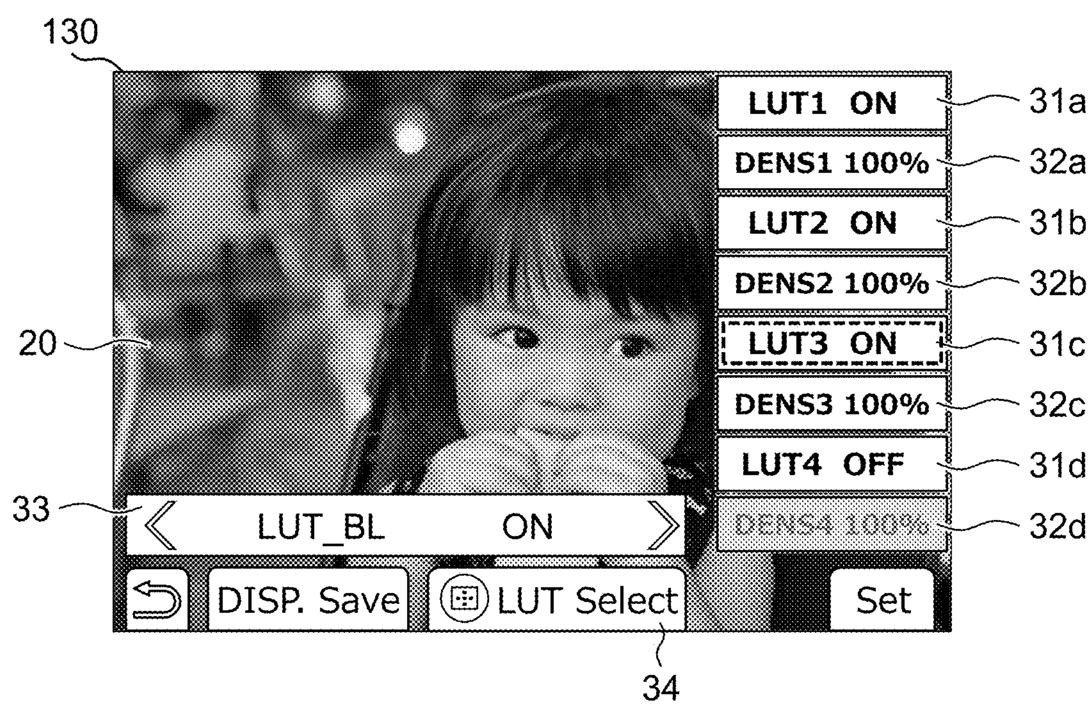
FIG. 7E is a diagram illustrating an example of the multi-LUT layering setting screen on the digital camera.
Figure 7F:
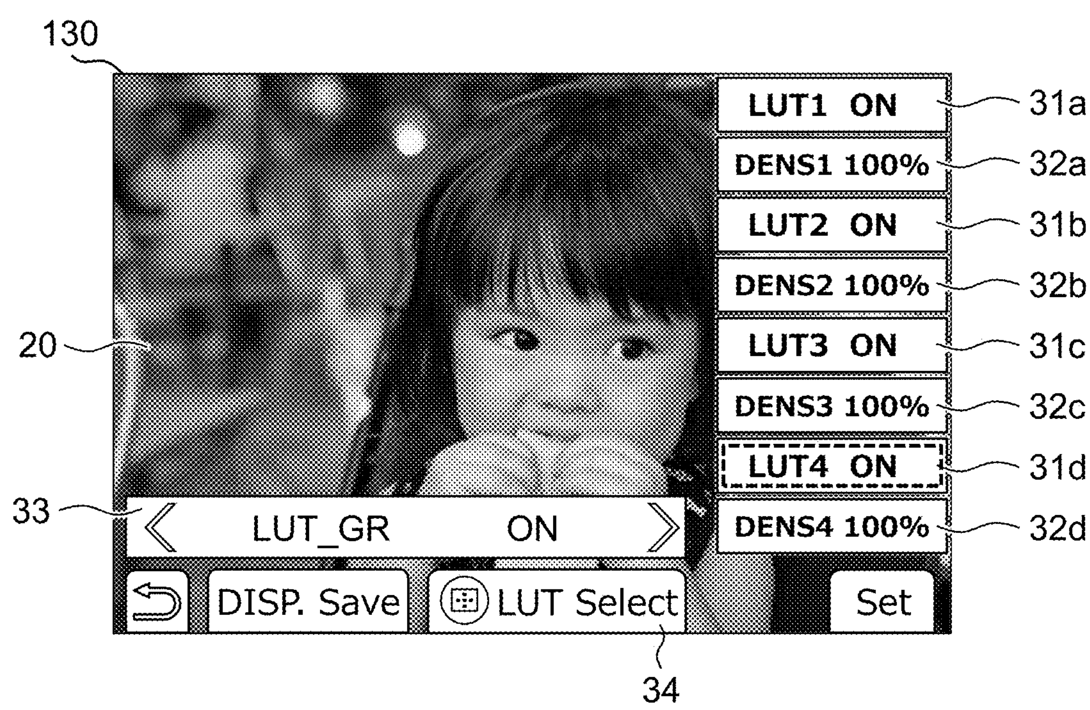
FIG. 7F is a diagram illustrating an example of the multi-LUT layering setting screen on the digital camera.

In the same manner as the setting of the LUT 2 described with reference to FIGS. 7C and 7D, the user can set the LUTs to be allocated to the LUT3 and the LUT4, respectively. FIG. 7E illustrates an example in which "LUT_BL" is allocated to the LUT3. "LUT_BL" is an example of an LUT for emphasizing blue. FIG. 7F illustrates an example in which "LUT_GR" is allocated to the LUT4. "LUT_GR" is an example of an LUT for emphasizing green.

FIG. 7F illustrates an example in which all of the LUTs 1 to 4 are set ON, but in the digital camera 100 according to this embodiment, it is not necessary to set all settable LUTs ON. For example, one or more of the LUTs 1 to 4 may be set ON. In the initial state, the LUT 1 having been set ON may be changed to OFF. It is also possible to set all the LUTs to OFF.

Figure 7G:
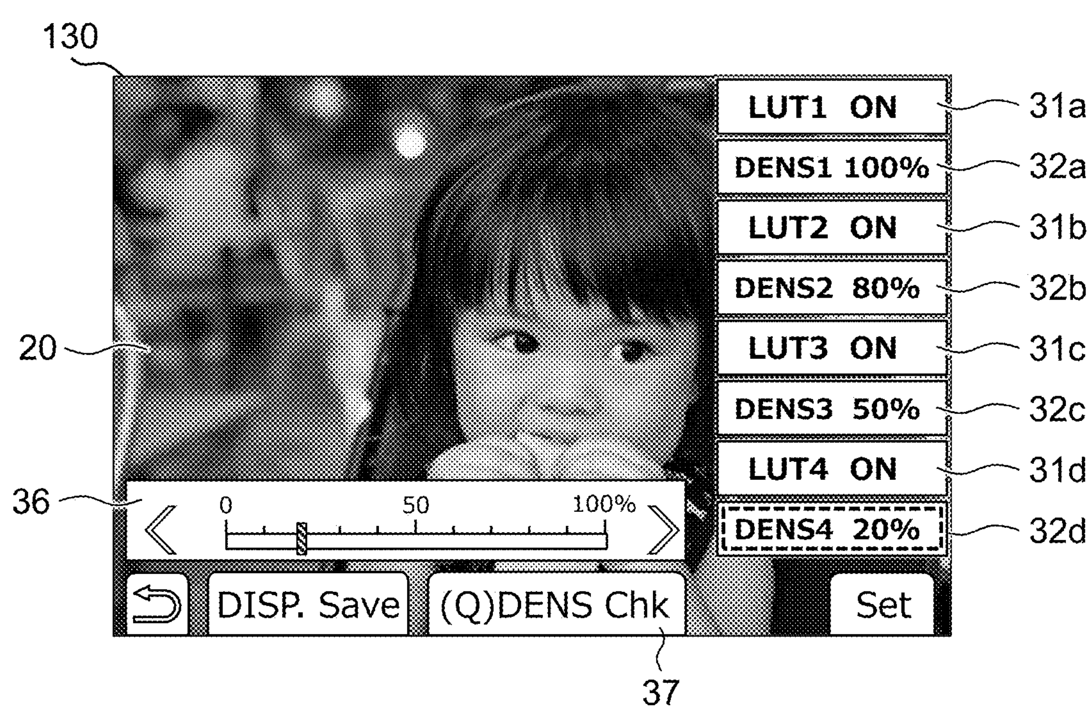
FIG. 7G is a diagram illustrating an example of the multi-LUT layering setting screen on the digital camera.

As illustrated in FIG. 7G, when any one of the density indicators 32*a*, 32*b*, 32*c*, and 32*d* is selected, a density adjustment menu 36 is displayed on the layering setting screen. In the example of FIG. 7G, the density indicator 32*d* has been selected, and the density adjustment menu 36 has a slide bar for adjusting the density. The user can then adjust the density of the LUT4, for example, by pressing a left or right cursor button.

The user can also adjust the density of the LUTs 1 to 3 corresponding to the first to third LUT mode indicators 31*a*, 31*b*, and 31*c* following the same steps.

When the user presses the OK button or the return button in the layering setting screens illustrated in FIG. 7A or FIGS. 7C to 7G, the controller 135 causes the display screen to transition to the LUT setting screen illustrated in FIG. 6.

2-1-3. Preview Screen after Density Changes in Plurality of LUTs

Although the density of each of the plurality of LUTs is changeable, as long as the density of each of the LUT is to be changed serially, the user cannot specifically grasp the specific color tone, image quality, and the like of the LUT-applied image, in the middle of setting a density change if the densities of the plurality of LUTs are to be changed at the same time. Therefore, it is difficult for the user to change the densities of the plurality of LUTs in a manner achieving the color tone, image quality, or the like as intended, or, even if such settings are achieved, it may take time to make settings for such density changes. For example, the user may change the density of the LUT 2 after changing the density of the LUT 1, and, if the result of the density change is not as intended, the user may readjust the density of the LUT 1.

The digital camera 100 according to this embodiment provides a preview screen allowing the results of changing the densities of the plurality of respective LUTs can be checked, before confirming such density changes.

The layering setting screen of FIG. 7G includes a density check button 37. When the user presses the density check button 37, the controller 135 causes the display screen to transition to a preview screen illustrated in FIG. 8A. The function of the density check button 37 is assigned to, for example, the Q button of the operation unit 150. In such a configuration, the user can cause the display screen to transition to the preview screen, also by pressing the Q button on the layering setting screen illustrated in FIG. 7G.

Figures 8A, 8B:
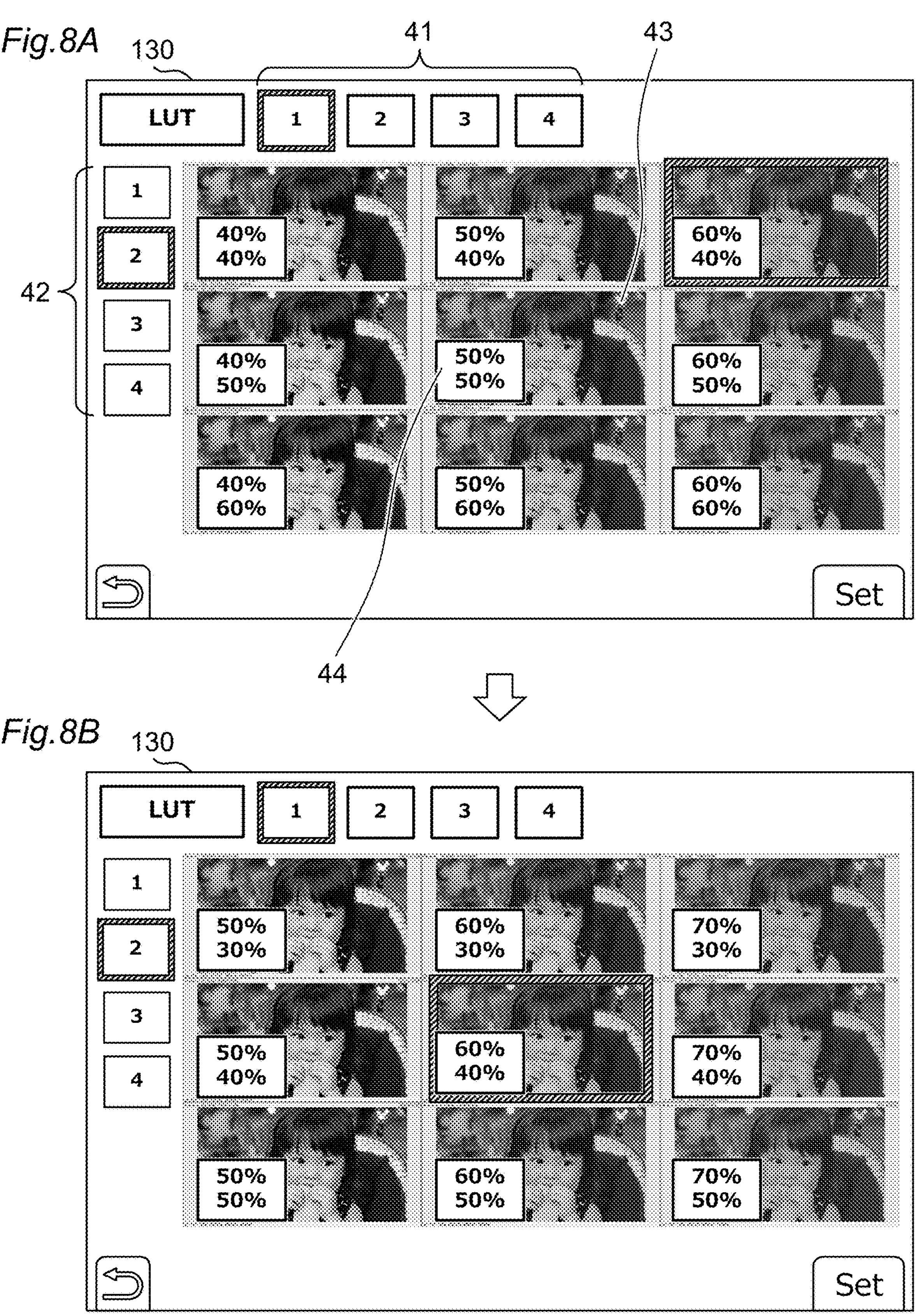
FIG. 8A is a diagram illustrating an example of a preview screen on the digital camera.
FIG. 8B is a diagram illustrating an example of a preview screen on the digital camera.

The preview screen illustrated in FIG. 8A has nine images that are arranged in a 3×3 matrix. In the example illustrated, an image 43 arranged at the center of the matrix is the image applied with the plurality of LUTs at the density currently set. The eight images arranged around the center image are preview images representing the results applying the plurality of LUTs by changing the density of at least one of the LUTs corresponding to the horizontal axis (hereinafter, each referred to as a "horizontal axis LUT") and the LUTs corresponding to the vertical axis (hereinafter, each referred to as a "vertical axis LUT"). These preview images are generated by the image processor 120, for example.

In the example of FIG. 8A, a horizontal axis LUT can be selected by the user using horizontal axis selection buttons 41. For example, when the user selects "1" from the horizontal axis selection buttons 41 using a cursor button, a touch panel, or the like, the controller 135 sets the LUT 1 to the horizontal axis LUT. In the example of FIG. 8A, the LUT 1 is selected as the horizontal axis LUT, and "1" in the horizontal axis selection buttons 41 is highlighted on the preview screen, to indicate that LUT 1 has been selected. Similarly, the vertical axis LUT can be selected by the user using vertical axis selection buttons 42, and in the example of FIG. 8A, the LUT 2 is selected as the vertical axis LUT. For example, the horizontal axis selection buttons 41 and the vertical axis selection buttons 42 corresponding to the LUTs having been OFF on the layering setting screen may be grayed out.

A density indicator 44 indicating the densities of the horizontal axis LUT and the vertical axis LUT corresponding to the image 43 is displayed in a manner superimposed over the image 43. The upper text in the density indicator 44 indicates the density of the horizontal axis LUT, and the lower text indicates the density of the vertical axis LUT. In the example of FIG. 8A, the LUT 1 that is the horizontal axis LUT corresponding to the image 43 has a density of 50%, and the LUT 2 that is the vertical axis LUT has a density of 50%.

The same density indicators are also displayed in a manner superimposed over the eight respective preview images arranged around the image 43. FIG. 8A illustrates an example in which the horizontal axis LUTs have higher densities toward the right (in the positive direction of the horizontal axis) and the vertical axis LUTs have higher densities toward the bottom (in the positive direction of the vertical axis), in the nine images arranged in a matrix. In the example of FIG. 8A, the difference between the horizontal axis LUT densities in the images that are adjacent to each other in the horizontal direction is 10%, and the difference between the vertical axis LUT densities in the images that are adjacent in the vertical direction is 10%. However, the density difference is not limited to 10%.

When one of the preview images is selected in FIG. 8A, the preview screen changes to the screen illustrated in FIG. 8B. FIG. 8A illustrates an example in which the preview image positioned at the upper right has been selected, and the selected preview image is surrounded by a frame and highlighted. The preview image having been selected in FIG. 8A is positioned at the center in FIG. 8B, among the nine images arranged in a matrix. In this manner, the digital camera 100 can display the preview images within ranges of densities not displayed on the preview screen of FIG. 8A, on the preview screen of FIG. 8B.

Upon receiving a user operation for changing at least one of the horizontal axis selection button 41 and the vertical axis selection button 42, the digital camera 100 can also display preview images applied with the LUTs (the LUT 3 and the LUT 4 in the examples of FIGS. 8A and 8B at different densities.

When the OK button or the return button is pressed on the preview screen of FIG. 8A or FIG. 8B, the controller 135 causes the display screen to transition to the layering setting screen illustrated in FIG. 7G.

By checking the preview images displayed on the display 130 of the digital camera 100 as described above, the user can know of the setting values of the densities of the plurality of LUTs that achieve the color tone, image quality, and the like intended by the user. Therefore, the user can set the densities of the plurality of LUTs in a manner achieving the color tone, image quality, and the like the user prefers, on the layering setting screen illustrated in FIG. 7G.

2-2. Operation for Displaying Live View Image

Figure 9:
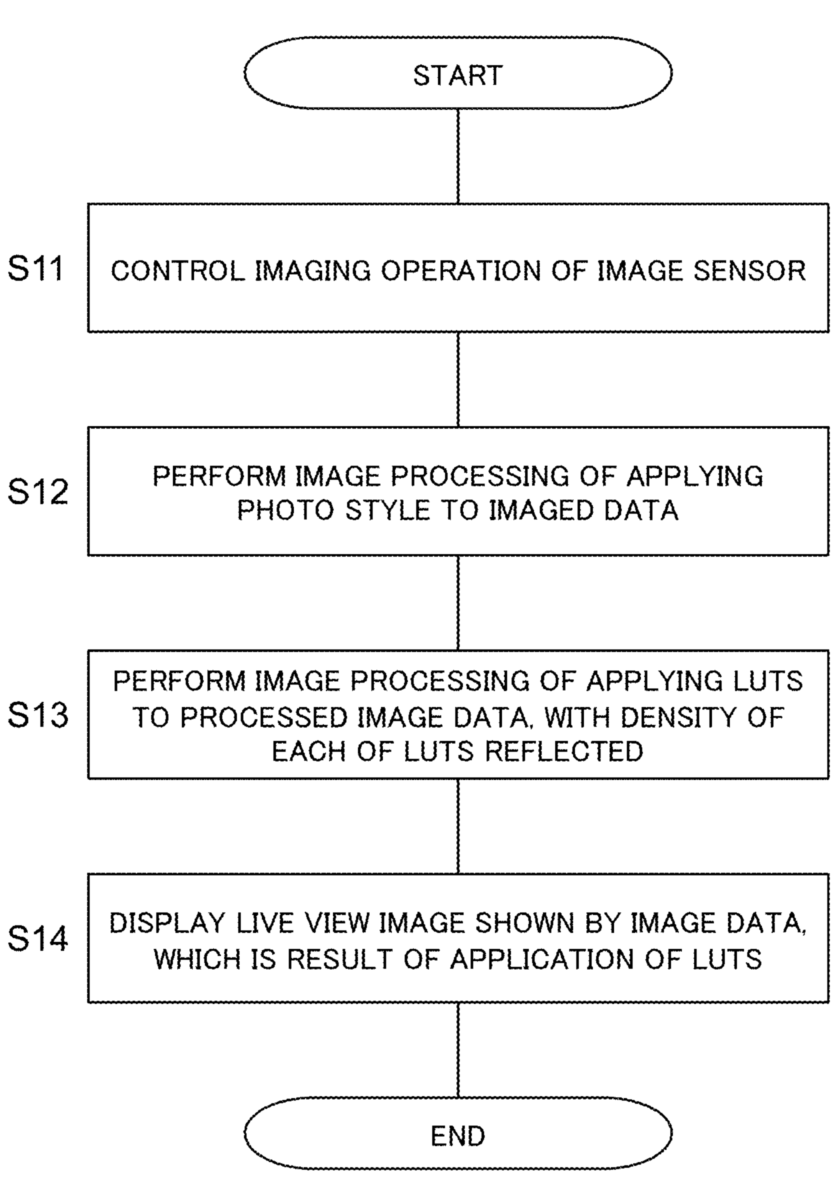
FIG. 9 is a flowchart for explaining an example of a live view image displaying operation in the digital camera.

An example of an operation for displaying the live view image 20 applied with the LUT and the photo style set as described above on the display 130 of the digital camera 100 according to the embodiment will now be explained with reference to FIG. 9. FIG. 9 is a flowchart for explaining an example of an operation for displaying the live view image 20 on the digital camera 100.

In FIG. 9, to begin with, the controller 135 controls the image sensor 115 on the basis of a user operation received by the operation unit 150, e.g., by a shutter button (S11). Under the control of the controller 135, the image sensor 115 captures a subject image formed via the optical system 110, generates RAW data, and outputs the RAW data to the image processor 120.

The image processor 120 then performs image processing of adjusting the image represented by the RAW data, under the control of controller 135, on the basis of the photo style selection information 13 registered in step S3 of FIG. 4 (S12). As a result of the image processing, image data applied with the photo style (in the description herein, sometimes referred to as "first processed image data") is generated as intermediate data.

The image processor 120 then applies the plurality of LUTs represented by the LUT selection information 14 registered in step S3 of FIG. 4, under the control of the controller 135, for example, to the first processed image data, with the density of each of the LUTs reflected (S13). As a result of the application, image data (hereinafter, sometimes referred to as "second processed image data") applied with the plurality of LUTs is generated. For example, the image processor 120 generates the second processed image data by converting each color of each pixel of the first processed image data, which is an input, into the color of the corresponding pixel of the output image, by referring to the plurality of LUTs and the densities of the respective LUTs represented by the LUT selection information 14.

As an example of applying (layering) a plurality of LUTs to the first processed image data, the image processor 120 sequentially applies the plurality of LUTs to the first processed image data, with the densities of the respective LUTs reflected. Alternatively, the image processor 120 may generate a composite LUT by making a composite of a plurality of LUTs indicated by the LUT selection information 14, with the densities of the respective LUTs reflected, and apply the composite LUT to the first processed image data.

The image processor 120 then outputs the second processed image data generated in step S13 to the display 130 as the live view image 20, under the control of the controller 135 (S14). The controller 135 may record the second processed image data output from image processor 120 in the memory card 142, via the card slot 141.

The process illustrated in FIG. 9 may be executed in parallel with the process illustrated in FIG. 4. For example, when the image processing setting information 12 is changed in step S3 of FIG. 4, the change is reflected to the photo style applied in step S12 of FIG. 9, or to the LUT and its density applied in step S13.

As described above, the digital camera 100 according to this embodiment can output image data applied with a plurality of LUTs with the densities of the respective LUTs reflected, and can output the image data applied with the LUTs in the manner described above, in real time.

3. Effects and the Like

As described above, the digital camera 100 as an example of the imaging device according to this embodiment includes the image sensor 115 as an example of the imaging unit, the flash memory 145 as an example of the storage, the display 130 as an example of the output unit, the operation unit 150, and the controller 135 as an example of the controller. The image sensor 115 captures a subject image to generate image data. The flash memory 145 stores therein a plurality of LUTs (an example of color conversion data) each defining a corresponding relationship between color information of an image before and after color conversion. The display 130 displays a live view screen on the basis of the image data. The operation unit 150 receives a user operation. The controller 135 designates the first LUT and the second LUT from the plurality of LUTs, in accordance with a user operation. The live view screen presents a live view image resultant of performing image processing for applying the first LUT and the second LUT to the image data.

With the digital camera 100 described above, users can apply a plurality of LUTs to image data, and the LUTs can be applied to the image in a manner suitable for the preferences of the users.

In the digital camera 100 according to this embodiment, the controller 135 may receive a user operation for designating a first density of the first LUT and a second density of the second LUT. The image processing may include processing of applying the first LUT to the image data in accordance with the first density, and processing of applying the second LUT to the image data in accordance with the second density.

With the digital camera 100 described above, users can apply a plurality of LUTs to image data, with the densities of the respective LUTs reflected, so that the users can obtain an image suiting for the preferences of the users.

In the digital camera 100 according to this embodiment, the controller 135 may cause the display 130 to display, side by side, a live view image and one or more preview images obtained by changing at least one of the first density and the second density on the live view image in response to a user operation.

With the digital camera 100 described above, by checking the preview image displayed on the display 130, the user can understand the setting values of the densities of the respective LUTs for achieving the color tone, the image quality, and the like the user prefers. Therefore, the digital camera 100 can make it easier to apply an LUT to the image, in a manner suitable for the preferences of users.

In the digital camera 100 according to the present exemplary embodiment, the controller 135 may store the first LUT, the first density, the second LUT, and the second density in the flash memory 145 in a manner associated with one another.

With the digital camera 100 described above, the data stored in the flash memory 145 is made available for the post-processing such as editing and post-production, for applying an LUT to image data not having been applied with any LUT.

In the digital camera 100 according to this embodiment, the controller 135 may generate a composite LUT by making a composite of the first LUT and the second LUT on the basis of the first density and the second density.

With the digital camera 100 described above, users can use the composite LUT that achieves an image suiting to the preference of the user, in the digital camera 100, an external information processing apparatus, or the like.

The digital camera 100 according to this embodiment may further include an output unit that outputs data. The controller 135 may output output image data resultant of performing image processing for applying the first LUT and the second LUT to the image data, via the output unit.

With the digital camera 100 described above, it is possible to output output image data resultant of applying a plurality of LUTs. The digital camera 100 can also output the output image data as described above in real time. Such output image data can be easily viewed and used on a general-purpose device such as a PC or a smartphone, unlike RAW data.

OTHER EMBODIMENTS

One embodiment has been described above, as one example of the technology according to the present disclosure. However, the technology according to the present disclosure is not limited thereto, and may also be applied to embodiments including changes, replacements, additions, omissions, and the like made as appropriate. In addition, it is also possible to combine the elements described in the embodiment to form a new embodiment. Other embodiments will now be explained as some examples.

In the example explained in the embodiment described above, the user sets the photo style selection information 13, in step S1, by selecting a photo style using the operation unit 150, and the controller 135 acquires the photo style selection information 13 set by the user operation. In the digital camera 100 according to the embodiment, the photo styles may be configured not selectable by the user, and a default photo style may be set in advance in such a manner that the photo style is not changeable by the user. One example of such a default photo style is "log", but is not limited thereto, and the default photo style may be set to any photo style.

Figure 10:
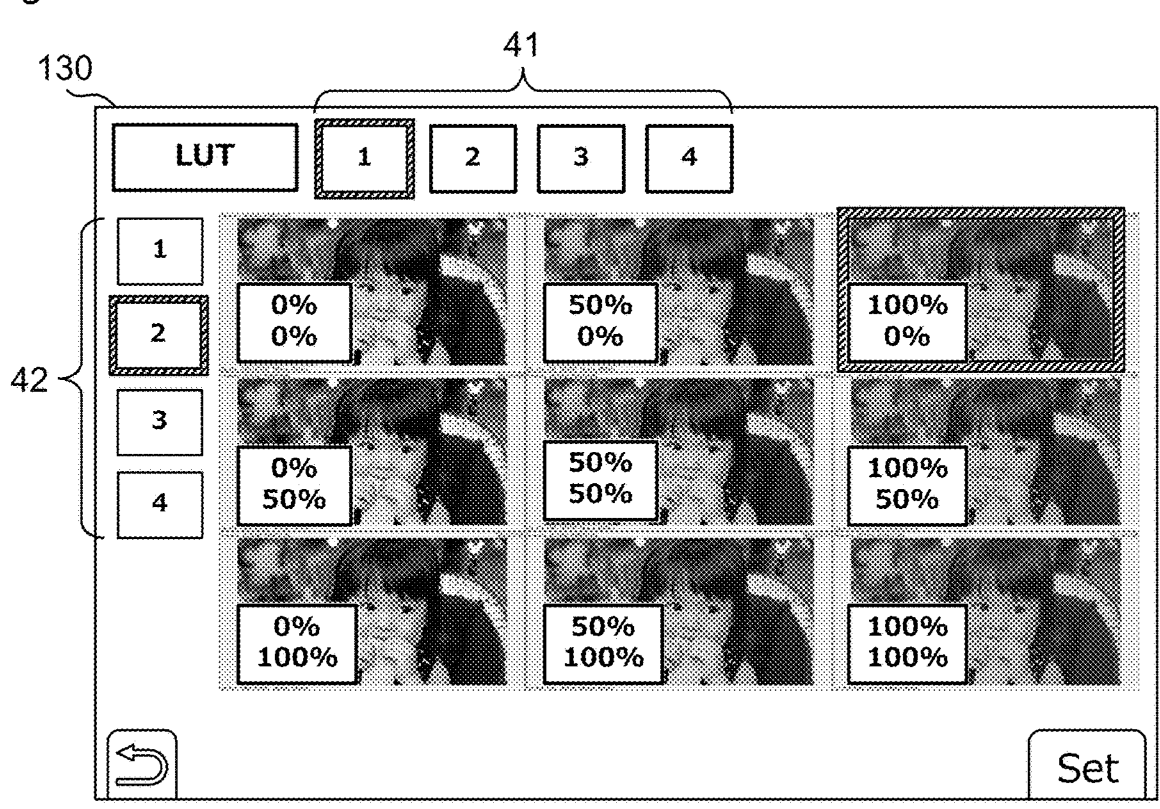
FIG. 10 is a diagram illustrating a modification of the preview screen on the digital camera.

Explained above in the embodiment is an example of a preview screen presenting a relative density distribution, so as to say, using the density of the LUT corresponding to the image positioned at the center of the matrix as a reference, in which the eight surrounding images have densities that are higher or lower than the reference density, as illustrated in FIGS. 8A and 8B. However, the digital camera 100 according to the embodiment only needs to be capable of providing a preview screen that serves as a reference for obtaining the density setting values of a plurality of LUTs for achieving the color tone, image quality, and the like suiting to the user's preference. For example, the digital camera 100 may display a preview screen as illustrated in FIG. 10 on the display 130. In FIG. 10, the preview images are arranged at predetermined density intervals, with reference to 0% and 100% densities at the respective ends of the horizontal and the vertical axes. The image 43 arranged at the center of the matrix in FIG. 8A is an image applied with a plurality of LUTs at the currently set densities, whereas the preview screen illustrated in FIG. 10 presents, so as to say, an absolute density distribution, regardless of the densities that are currently set.

Explained in the above embodiment is an example in which the digital camera 100 allowing the user to set the density of each of the plurality of LUTs on the layering setting screen illustrated in FIG. 7G. However, at least one of the densities of the plurality of LUTs may be configured settable by a user using the preview screen illustrated in FIG. 8A. For example, when an input of a user operation for selecting one of the nine images displayed on the preview screen is received by the operation unit 150, the controller 135 determines the density of the selected image as the density of the LUT. In the example of FIG. 8A, when the user selects the preview image at the upper right of the preview screen of FIG. 8A, using the cursor button, the touch panel, or the like and presses the OK button, the controller 135 sets the density of the LUT 1 to 60% and the density of the LUT 2 to 40%. With this configuration, the user can change the densities of the plurality of respective LUTs easily, after checking the effect of changing the density on the preview screen.

Explained in the above embodiment is an example in which an image such as a live view image or a preview image is output to the display 130 which is an example of the output unit. However, such an image may be output to an external monitor 160 via the video output terminal 155 which is another example of the output unit. As described above, the output unit according to the present disclosure includes at least one of the display 130 and the video output terminal 155 that is communicatively connected to the monitor 160.

In the embodiment described above, a digital camera has been explained an example of the imaging device, but the imaging device is not limited thereto. The imaging device according to the present disclosure may be an electronic device having an imaging function (such as a video camera, a smartphone, or a tablet terminal).

Example of Aspects

Hereinafter, various aspects according to the present disclosure will be listed.

Aspect 1 provides an imaging device comprising:

an imaging sensor configured to capture a subject image to generate image data;

a storage configured to store a plurality of color conversion data each defining a corresponding relationship between color information of an image before and after color conversion;

an output unit configured to output a live view screen based on the image data;

an operation unit configured to receive a user operation; and a controller configured to designate first color conversion data and second color conversion data from the plurality of color conversion data, in accordance with the user operation, wherein the live view screen presents a live view image resultant of image processing of applying the first color conversion data and the second color conversion data to the image data.

Aspect 2 provides the imaging device according to aspect 1, wherein the controller receives the user operation of designating a first density of the first color conversion data and a second density of the second color conversion data, and the image processing includes processing of applying the first color conversion data to the image data in accordance with the first density, and processing of applying the second color conversion data to the image data in accordance with the second density.

Aspect 3 provides the imaging device according to aspect 2, wherein the controller causes the output unit to output a screen displaying the live view image and one or more preview images obtained by changing at least one of the first density and the second density on the live view image in response to the user operation.

Aspect 4 provides the imaging device according to aspect 2 or 3, wherein the controller stores the first color conversion data, the first density, the second color conversion data, and the second density in the storage in a manner associated with one another.

Aspect 5 provides the imaging device according to any of aspects 2 to 4, wherein the controller generates composite color conversion data by making a composite of the first color conversion data and the second color conversion data in accordance with the first density and the second density, respectively.

Aspect 6 provides the imaging device according to any of aspects 1 to 5, further comprising an output interface configured to output data, wherein the controller outputs, via the output interface, output image data obtained by performing the image processing of applying the first color conversion data and the second color conversion data to the image data.

Aspect 7 provides the imaging device according to any of aspects 1 to 6, further comprising an image processor configured to perform the image processing to the image data.

The present disclosure is applicable to various imaging apparatuses.

What is claimed is:

1. An imaging device comprising:

an imaging sensor configured to capture a subject image to generate image data;

a storage which stores a plurality of color conversion data, each of the plurality of color conversion data being a respective lookup table (LUT) defining a corresponding relationship between color information of an image before and after color conversion;

an output unit configured to output a live view screen based on the image data;

an operation unit configured to receive a user operation; and a controller configured to designate first color conversion data and second color conversion data from the plurality of color conversion data, in accordance with the user operation, wherein the live view screen presents a live view image resultant of image processing of applying the first color conversion data and the second color conversion data to the image data.

2. The imaging device according to claim 1, wherein the controller receives the user operation of designating a first density of the first color conversion data and a second density of the second color conversion data, and the image processing includes processing of applying the first color conversion data to the image data in accordance with the first density, and processing of applying the second color conversion data to the image data in accordance with the second density.

3. The imaging device according to claim 2, wherein the controller causes the output unit to output a screen displaying the live view image and one or more preview images obtained by changing at least one of the first density and the second density on the live view image in response to the user operation.

4. The imaging device according to claim 2, wherein the controller stores the first color conversion data, the first density, the second color conversion data, and the second density in the storage in a manner associated with one another.

5. The imaging device according to claim 2, wherein the controller generates composite color conversion data by making a composite of the first color conversion data and the second color conversion data in accordance with the first density and the second density, respectively.

6. The imaging device according to claim 1, further comprising an output interface configured to output data, wherein the controller outputs, via the output interface, output image data obtained by performing the image processing of applying the first color conversion data and the second color conversion data to the image data.

7. The imaging device according to claim 1, further comprising an image processor configured to perform the image processing to the image data.

* * * * *